United States Patent [19]

Kühnlein et al.

[11] 4,383,887

[45] May 17, 1983

[54] PROCESS AND APPARATUS FOR THE CONCENTRATION OF AN ALKALINE SOLUTION

[75] Inventors: Hans Küζριρə Füllinsdorf; Hans R. Küng, Frenkendorf; Georg Molnar, Füllinsdorf, all of Switzerland

[73] Assignee: Bertrams AG, Basel, Switzerland

[21] Appl. No.: 280,481

[22] Filed: Jul. 6, 1981

[30] Foreign Application Priority Data

Jul. 11, 1980 [CH] Switzerland ............... 5327/80

[51] Int. Cl.³ ............................................. B01D 1/22
[52] U.S. Cl. ....................................... 159/13 A; 203/89
[58] Field of Search ................ 159/13 R, 13 A, 13 C, 159/49; 203/89

[56] References Cited

FOREIGN PATENT DOCUMENTS 740825 11/1955 United Kingdom

*Primary Examiner*—Frank Sever

*Attorney, Agent, or Firm*—Birch, Stewart, Kolasch & Birch

[57] ABSTRACT

A method and apparatus for the concentration of an alkaline solution to an approximately anhydrous melt using the falling-film principle under atmospheric pressure wherein the solution to be concentrated is conducted along the internal surface of evaporator tubes (1). Each tube (1) is surrounded by a heating jacket (2). The heating jackets (2) are fed with heat-transfer fluid from a conduit (6) which is common to all jackets. An annular collecting trough (8) is associated with the lower end of each evaporator tube (1). The metal running off from the tube (1) is collected by the trough (8) separately from the vapors. All of the troughs (8) are connected to a melt discharge line (9) which is also common to all troughs. The vapors descending in the tube (1), in contrast thereto, pass through the opening (8a) of the collecting troughs (8) into a collecting duct (10) which is common to all troughs. By the separation of the melt and vapors at the tube end portions, a renewed drop in the alkali concentration is avoided.

12 Claims, 2 Drawing Figures

PROCESS AND APPARATUS FOR THE CONCENTRATION OF AN ALKALINE SOLUTION

BACKGROUND AND SUMMARY OF THE INVENTION

The present invention relates to a process for the concentration of alkaline solution wherein the alkaline solution is concentrated under atmospheric pressure in the form of a heated falling-film to form a practically anhydrous melt. The present invention is also directed to an apparatus for conducting the present process.

NaOH and KOH solutions are obtained, for example, in chlorine manufacture by NaCl electrolysis, as an 11–50% solution. It is known to concentrate such solutions in falling-film evaporators to a practically anhydrous melt, and to pour the melt subsequently into barrels or to further process them into flakes or prills. Operating under atmospheric pressure has proven to be especially economical in view of the energy costs, since in this case the thus-produced vapors can be directly used, without compression, for the preliminary concentration of the solution, which represents a considerable saving in energy.

However, the difficulty has existed as to how to operate such high concentrators under atmospheric pressure, because NaOH and KOH solutions exhibit very high boiling temperatures at atmospheric pressure and are also very corrosive so that the construction materials employed are exposed to extremely high thermal and corrosive stresses.

Due to these relationships, it has not been possible heretofore to operate alkaline melt high concentration devices under practical conditions, since these devices were either operated under vacuum, and the vapor heat could not be recovered, or they were operated under atmospheric pressure, with the simultaneous recovery of the vapor heat, with the disadvantage that the operating temperatures were so high that they adversely affected the durability of the construction materials.

Accordingly, an object of the present invention is to provide a process which utilizes the falling-film principle with an appropriate apparatus for the concentration of an alkaline solution which no longer exhibits the aforedescribed disadvantages.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The process of the present invention is characterized in that the alkaline melt running off from the film support is collected separately from the vapors and further conducted separately from the vapors.

The apparatus for conducting this process, according to the present invention comprises at least one cylindrical evaporator tube equipped with a heating jacket and serving as the falling-film support, wherein an annular collecting trough for the melt is associated with the lower tube edge and is in communication with a discharge line. The interior of the tube is in communication, through a central opening in the collecting trough, with a vapor collecting duct.

This separate collection and discharge of the melt and vapors prevents a remixing of the concentrated melt and the vapors after exiting from the evaporator tubes. This remixing would again considerably raise the water content of the concentrated melt, since the vapors, once they leave the evaporator tube, are not in boiling equilibrium with the melt, i.e., they have a temperature lying below the boiling point of the melt. This is due to the fact that the vapors produced by evaporation in the upper portion of the evaporator tube are not heated up to the boiling temperature of the concentrated melt along their way to the lower edge of the tube.

The immediate separation of the melt and the vapors on the lower edge of the tube, according to the present invention is of economic significance inasmuch as the demanded, high final concentrations can be attained at operating temperatures which are relatively low, even when operating under atmospheric pressure. Therefore, two goals can be achieved according to the present invention, i.e., the reuse of the vapor heat as a consequence of operating at atmospheric pressure and simultaneously, the relatively low operating temperature and the concomitant longer lifetime of the concentrator.

In contrast thereto, an intermixing of the concentrated melt and the vapors takes place in conventional evaporator systems not equipped with a collecting trough for the concentrated melt. This intermixing occurs in the collecting duct, i.e., in the vapor separator and results in a considerable dilution of the concentrated melt until the melt and vapors are again in temperature equilibrium. It has been observed that under these conditions the concentration of the melt can again decrease by almost one-half percent, leading to an unsatisfactory concentration if the melt is to be processed into flakes or prills.

Apart from the obvious advantages attained from the viewpoint of process technique, the collection and removal of the concentrated melt separately from the vapors also have the advantage that the highly corrosive melt does not come into contact with the entire separating system for the melt and vapors, but rather only with those parts used in conducting the melts. These parts require a relatively minor amount of high-quality construction material and can be readily exchanged. However, the voluminous portion of the separator system, namely the vapor discharge duct, can consist of a very thin material since it is no longer in contact with the corrosive melt and thus does not suffer from corrosive deterioration.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
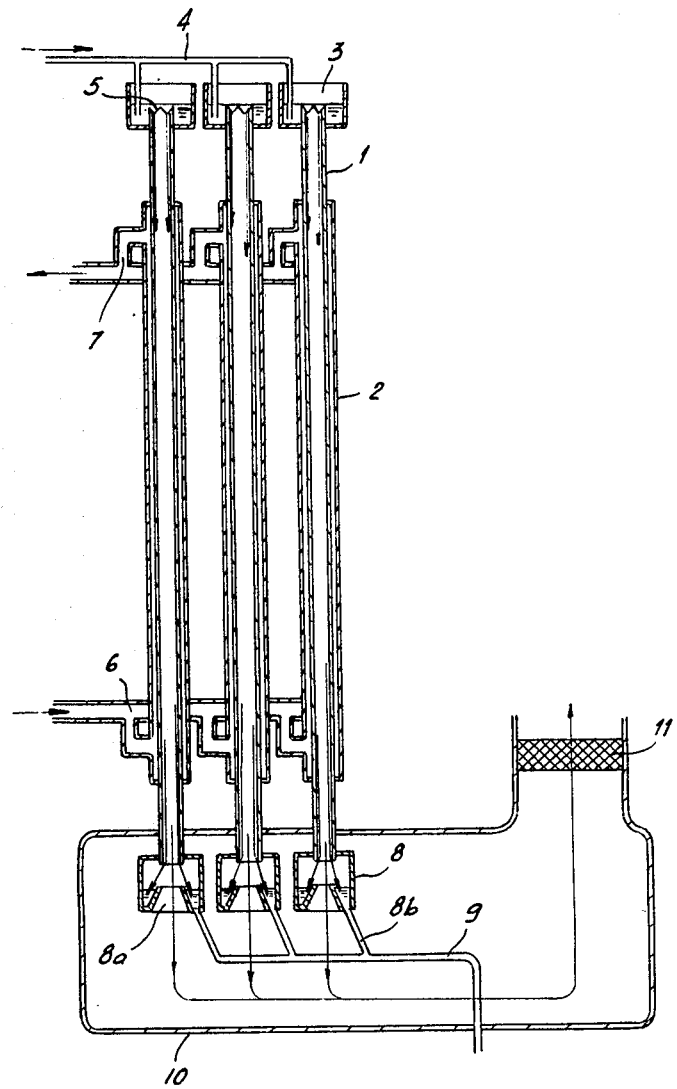
FIG. 1 schematically shows in a vertical, sectional view, a concentrating device of the present invention with several falling-film evaporator tubes.

The apparatus of the present invention comprises cylindrical evaporator tubes noted as element 1, encompassed by respectively, relatively narrow heating jackets 2. A distributor head 3 is arranged at the upper end of each evaporator tube 1. The distributor heads 3 are in communication with an alkaline solution feed conduit 4. The upper rim 5 of the tube 1, which is disposed within the distributor head 3 is fashioned as a serrated overflow edge. The heating jackets 2 are connected at the bottom to a feed line 6 for the introduction of a heat-transfer fluid, for example an inorganic salt melt, and at the top to a collecting conduit 7 for recycling the heat-transfer fluid to a heating device, not shown. At the lower end of each evaporator tube 1 an annular collecting trough 8 is respectively provided, said trough being associated with the tube edge. All collecting troughs 8 are in communication with outlet pipes 8b and a common discharge line 9 leading to a collection tank, not shown. The interior of each evaporator tube 1 is in communication with a vapor duct 10 through the annular opening 8a of the discharge troughs 8, the vapor duct being equipped at the outlet thereof with a mist precipitator 11.

Figure 2:
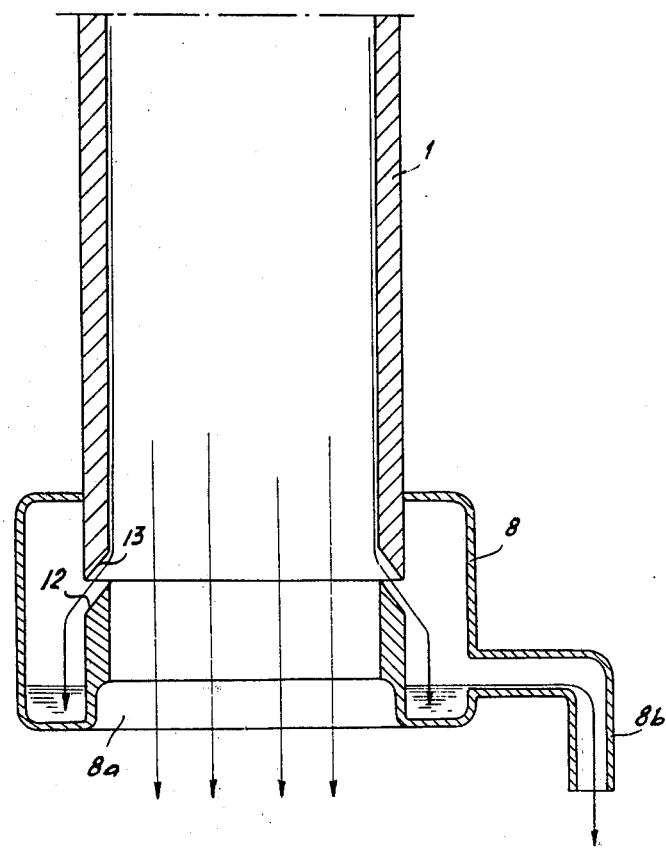
FIG. 2 shows in an enlarged scale and in an axial sectional view the lower portion of an evaporator tube with a collecting trough for recovering the melt.

An especially advantageous embodiment of the lower tube portion and the collecting trough is illustrated in FIG. 2. The inner wall of the collecting trough 8, which is in contact with the evaporator tube 1 with an upwardly extended and inwardly curved outside wall, terminates with its upper end face rim 12 spaced apart a small distance and disposed below the lower end face rim 13 of the evaporator tube 1. The inner wall exhibits a slightly larger internal diameter than the tube 1. The end face rim 13 of the tube 1 as well as the end face rim 12 of the inner wall of the collecting trough 8 are conically beveled in the outward direction at an acute angle with the formation of a sharp outer and inner edge, respectively. The edge angle can be selected to be between about 16° and 45°, with an angle of about 27° being particularly advantageous. The arrangement is such that the sharp end edges of the two end face rims 12 and 13 lie approximately in the same plane.

In one example of operating the aforedescribed concentrating apparatus, the heat-transfer fluid is conducted at a temperature of about 450° C. via the common feed line 6 to the evaporator device and from there to the individual heat-transfer jackets 2 and eventually leaves the device through the collecting conduit 7 at a temperature of about 390° C. NaOH solution of 50% strength is conducted at a temperature of 40° C. through the conduit 4 into the evaporator tubes 1 wherein it flows downwardly along the inside surface of the evaporator tubes in the form of a coherent film. In the uppermost partial section of the tubes 1, the NaOH solution is initially heated to a boiling temperature of about 140° C. and then concentrated during the course of its further flow through the tube to a concentration of 99.3%. The film of concentrated melt is collected in the collecting troughs 8 at a temperature of about 430° C. During this step the melt film flows along the conical end face rim 13 of the tubes 1 toward the outside of the collecting trough 8, and falls from the tube edge downwardly onto the end face rim 12 of the collecting trough 8 and from there passes safely into said trough. It has been found that a pronounced segregation between the liquid film (melt) and the stream of water vapor (vapors) is established early in the evaporator tube 1 proper, mainly in the lower portion thereof, and this segregation becomes complete once the melt film flows at the lower tube end toward the outside thereof, as mentioned above, and passes into the collecting trough 8. The vapors descending within the tube 1 pass through the central opening 8a of the collecting troughs 8 into the vapor duct 10. It is remarkable that at this point the vapor temperature is merely 330° C. This corresponds to a mixing temperature of the water quantity evaporating to between 140° and 430° C.

The aforedescribed separation of melt and vapors ensures that the high alkali concentration attained at the tube end will indeed be preserved.

It is understood that the lower end of the evaporator tube 1, instead of being conically beveled, can also be conically flared. It is merely important that the lower runoff edge of the tube lies radially outside the upper edge of the inner wall of the collecting trough 8. The inner diameter of the inner wall should be, at most, equal to the inner diameter of the tube 1 to prevent the vapors, which flow downwardly in the tube 1 in relative proximity to the wall, from also being deflected toward the outside by the inner wall of the collecting trough. It is also possible, on the other hand, to provide the inner wall of the collecting trough with a stripping edge (baffle edge) projecting in close proximity to the wall into the end of evaporator tube 1, for effecting a separation of the melt film and the vapor stream directly upstream of the tube end.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for concentrating an alkaline solution which comprises:
   at least one evaporator tube having an inner diameter, an internal surface, and upper and lower portion, at least one evaporator tube,
   means for introducting said alkaline solution to be concentrated into said upper portion of said evaporator tube so that a film of said alkaline solution falls along said internal surface of said evaporator tube,
   heat exchange jacket means surrounding and spaced apart from said evaporator tube along its substantial length, said jacket means and evaporator tube defining an annular channel therebetween for receiving a heat exchange fluid,
   a collecting trough operatively associated with said lower portion of said evaporator tube, having an inner diameter equal to or greater than said inner diameter of said evaporator tube whereby said collecting trough effectively separates concentrated liquid from vapor,
   means for recovering said separated concentrated liquid from said collecting trough, and
   vapor duct means for recovering said vapor separately from said concentrated liquid, said means for introducing said alkaline solution being sized and said inner diameter of said collecting trough and said inner diameter of said evaporator tube being sized, positioned and dimensioned to coact so as to prevent a remixing of said concentrated alkaline solution and said vapor after exiting from said evaporator tube.

2. The apparatus of claim 1 wherein the collecting trough includes an annular zone for collecting the concentrated liquid from the internal surface of the evaporator tube and a central zone for recovering the vapor therefrom.

3. The apparatus of claim 2 wherein a discharge conduit is connected to the annular zone and a vapor collecting duct communicates with said central zone.

4. The apparatus of claim 2 wherein the upper end portion of the collecting trough is canted inwardly at an angle which extends beyond the circumferential edge of the evaporator tube for recovering the film of concentrated solution falling along the inner surface of the collecting trough.

5. The apparatus of claim 4 wherein the angle is between 16° and 45°.

6. The apparatus of claim 2 wherein the upper end face rim of the inner wall of the collecting trough is conically beveled toward the outside, said evaporator tube wall and the inner wall of the collecting trough being disposed in approximate vertical alignment with each other.

7. The apparatus of claim 6 wherein the lower end face rim of the evaporator tube is also beveled in a conical fashion at the same angle as the end face rim of the collecting trough.

8. The apparatus of claim 7 wherein the edge angle of the upper end face rim and the lower end face rim is between about 16° and 45°.

9. The apparatus of claim 7 wherein the edge angle is about 27°.

10. The apparatus of claim 7 wherein a small axial distance exists between the lower end face rim of the evaporator tube and the end face rim of the collecting trough so that the sharp edges of said two end face rims lie approximately in the same plane.

11. The apparatus of claim 1 wherein the lower end of the evaporator tube is conically flared so that the lower runoff edge of the tube lies radially outside the upper edge of the inner wall of the collecting trough.

12. The apparatus of claim 11 wherein the evaporator tube is conically flared at an angle of about 16° to 45°.

* * * * *

UNITED STATES PATENT AND TRADEMARK OFFICE
CERTIFICATE OF CORRECTION

PATENT NO. : 4,383,887
DATED : May 17, 1983
INVENTOR(S) : Kühnlein et al

It is certified that error appears in the above-identified patent and that said Letters Patent are hereby corrected as shown below:

In the Heading of the Patent, in the category "[75] Inventors:", delete the first inventor's name and insert --Hans Kühnlein--.

Signed and Sealed this

Twenty-seventh Day of December 1983

[SEAL]

Attest:

GERALD J. MOSSINGHOFF

Attesting Officer    Commissioner of Patents and Trademarks